US012087186B2

(12) United States Patent
Fan

(10) Patent No.: US 12,087,186 B2
(45) Date of Patent: Sep. 10, 2024

(54) SPLICED SCREEN OF DISPLAY AND DISPLAY DEVICE COMPRISING THE SAME

(71) Applicants: Huizhou China Star Optoelectronics Display Co., Ltd., Guangdong (CN); TCL China Star Optoelectronics Technology Co., Ltd., Guangdong (CN)

(72) Inventor: Yongping Fan, Guangdong (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/622,883

(22) PCT Filed: Dec. 22, 2021

(86) PCT No.: PCT/CN2021/140363
§ 371 (c)(1),
(2) Date: Dec. 27, 2021

(87) PCT Pub. No.: WO2023/103090
PCT Pub. Date: Jun. 15, 2023

(65) Prior Publication Data

US 2024/0038103 A1 Feb. 1, 2024

(30) Foreign Application Priority Data

Dec. 9, 2021 (CN) .......................... 202111501184.6

(51) Int. Cl.
*G09F 9/30* (2006.01)
*G09F 9/302* (2006.01)

(52) U.S. Cl.
CPC .................................. *G09F 9/3026* (2013.01)

(58) Field of Classification Search
CPC ..................................................... G09F 9/3026
See application file for complete search history.

(56) References Cited

U.S. PATENT DOCUMENTS

| | | | | |
|---|---|---|---|---|
| 2007/0262916 | A1 | 11/2007 | Kee et al. | |
| 2020/0168696 | A1* | 5/2020 | Hsiao | H10K 59/35 |
| 2022/0322542 | A1* | 10/2022 | Wu | G06F 1/1637 |
| 2022/0404659 | A1* | 12/2022 | Qi | G02F 1/1336 |

FOREIGN PATENT DOCUMENTS

| | | |
|---|---|---|
| CN | 104464557 | 3/2015 |
| CN | 205177335 | 4/2016 |
| CN | 205281991 | 6/2016 |
| CN | 106842711 | 6/2017 |

(Continued)

*Primary Examiner* — Afroza Chowdhury

(57) ABSTRACT

A spliced screen and a display device are provided. A light-emitting unit is arranged and covers the area between display areas of a two unit screens. When the display area of the unit screens normally functions, a plurality of light-emitting units on a light bar can be transmitted and displayed synchronously, cover an area which cannot be shown between the display areas of the two unit screens, and further, weaken or eliminate a slit visually. In this way, the display screen of each of the unit screens is coherently connected to the display screen, and the visual screen-to-body ratio increases as well.

13 Claims, 3 Drawing Sheets

(56) References Cited

FOREIGN PATENT DOCUMENTS

| | | |
|---|---|---|
| CN | 111290154 | 6/2020 |
| CN | 111369900 | 7/2020 |
| CN | 212516414 | 2/2021 |
| CN | 112599030 | 4/2021 |
| CN | 112767849 | 5/2021 |
| CN | 112863390 | 5/2021 |
| CN | 113270049 | 8/2021 |
| CN | 113707034 | 11/2021 |
| CN | 113763823 | 12/2021 |

* cited by examiner

SPLICED SCREEN OF DISPLAY AND DISPLAY DEVICE COMPRISING THE SAME

RELATED APPLICATIONS

This application is a National Phase of PCT Patent Application No. PCT/CN2021/140363 having International filing date of Dec. 22, 2021, which claims the benefit of priority of Chinese Patent Application No. 202111501184.6 filed on Dec. 9, 2021. The contents of the above applications are all incorporated by reference as if fully set forth herein in their entirety.

FIELD AND BACKGROUND OF THE INVENTION

The present disclosure relates to display technology, and more particularly, to a spliced screen and a display device.

With the development of electronic display products, consumers tend to pursues products with better visual experiences. Subject to technical restrictions, a frame area is inevitably formed outside a display area in a display panel of the related art, the frame area limits the development of its corresponding electronic products. For example, the frame area of the unit screens is formed among every one of the unit screens, and the slit is formed by a frame gap, so these slits will affect the visual sensory of the user, and the visual screen-to-body ratio decreases as well in the field of spliced screens.

SUMMARY OF THE INVENTION

An object of the present disclosure is to propose a spliced screen, to improve the display effect of a slit influencing on a spliced screen.

According to a first aspect of the present disclosure, a spliced screen includes a plurality of unit screens and a light bar. The plurality of unit screens are spliced to one another. Each of the plurality of unit screens includes an eminent surface and a backlight surface. The eminent surface and the backlight surface are arranged opposite. The eminent surface is formed by a display area and a frame area. The frame area surrounds the display area. The light bar is disposed between the two spliced unit screens. The light bar includes a cover area, abutting on an eminent surface of the unit screens, a plurality of light-emitting units, and a defined area. The plurality of light-emitting units are disposed on a side of the cover area away from the eminent surface. A part or more of the light-emitting units cover an area between the two display areas of the two unit screens. The defined area is firmly connected to the cover area and butting on the backlight surface of the two spliced unit screens.

Optionally, a part or more of the light-emitting units cover the frame area at a spliced area of the two unit screens.

Optionally, areas of the eminent surfaces of the unit screens contacting the defined area are the same.

Optionally, the light bar further comprises a connecting area; the connecting area is disposed in a slit between the two unit screens. The defined area is connected to the cover area with the connecting area.

Optionally, the light bar comprises a driving wiring and a display driving unit configured to drive the light-emitting unit; the display driving unit is arranged on the defined area; the driving wiring is electrically connected to the display driving unit; the driving wiring is sequentially extended to the connecting area and the cover area from the defined area and electrically connected to the light-emitting unit.

Optionally, the light bar comprises an elastic tension component; the elastic tension component is disposed on the connecting area; the elastic tension component is connected to the connecting area so that the area where the connecting area and the cover area are connected and the area where the connecting area and the defined area are connected have a tendency to move toward each other.

Optionally, the elastic tension component is made of rubber.

Optionally, the light bar further comprises a first connecting structure disposed on the defined area; a second connecting structure is formed on the backlight surface of the unit scree and is adapted to the first connecting structure; the first connecting structure is connected to the second connecting structure.

Optionally, the first connecting structure is a tapped hole which is formed and sunken on the backlight surface of the unit screens; the second connecting structure is a screw, and the tapped segment of the screw penetrates the defined area and is tapping-connected to the tapped hole.

Optionally, the first connecting structure is a jack which is formed and sunken on the backlight surface of the unit screens; the second connecting structure is a swapping block; a terminal of the swapping block is a plug-in terminal; the shape of the plug-in terminal and the shape of the jack is complementary; the plug-in terminal passes through the defined area and inserted into the jack; the other terminal of the swapping block extending out of one side of the defined area back away from the unit screens is a bending terminal.

Optionally, the bending terminal of the swapping block is shaped as a wave.

Optionally, the bending terminal of the swapping block is shaped as a curve.

Optionally, the terminal of the swapping block extending to the defined area back away from the unit screens is wavy in shape.

Optionally, the unit screen comprises a backlight module, an array substrate, a liquid crystal layer, and an opposite substrate; the backlight module, the array substrate, the liquid crystal layer, and the opposite substrate are stacked in a direction to eminence; a part or more of the tapped holes extends to the backlight module.

Optionally, the unit screen further comprises a sub pixel unit disposed in an area corresponding to the display area; a projection of the subpixel unit onto the eminent surface of the unit screens and a projection the light-emitting unit onto the eminent surface of the unit screens are arranged in an array.

The present disclosure proposes a spliced screen and a display device. A light-emitting unit is arranged and covers the area between display areas of a two unit screens. When the display area of the unit screens normally functions, a plurality of light-emitting units on a light bar can be transmitted and displayed synchronously, cover an area which cannot be shown between the display areas of the two unit screens, and further, weaken or eliminate a slit visually. In this way, the display screen of each of the unit screens is coherently connected to the display screen, and the visual screen-to-body ratio increases as well. Besides, owing to a light bar including a defined area, the light bar can be more securely connected between the two unit screens, which enhances the structural stability of the formed spliced screen.

BRIEF DESCRIPTION OF THE SEVERAL VIEWS OF THE DRAWINGS

These and other features of the present invention will become apparent from the following description of some embodiments, given as a non-restrictive example with reference to the attached drawings wherein.

REFERENCE CHARACTER

100—spliced screen; 101—slit; 200—unit screen; 201—eminent surface; 201*a*—display area; 201*b*—frame area; 202—; 203—backlight module; 204—array substrate; 205—liquid crystal layer; 206—opposite substrate; 207—frame; 300—light bar; 301—cover area; 302—light-emitting unit; 303—defined area; 304—screw; 305—connecting area.

DESCRIPTION OF SPECIFIC EMBODIMENTS OF THE INVENTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

It will be understood that, although the terms “first”, “second”, “third”, etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Embodiment 1

Figure 3:
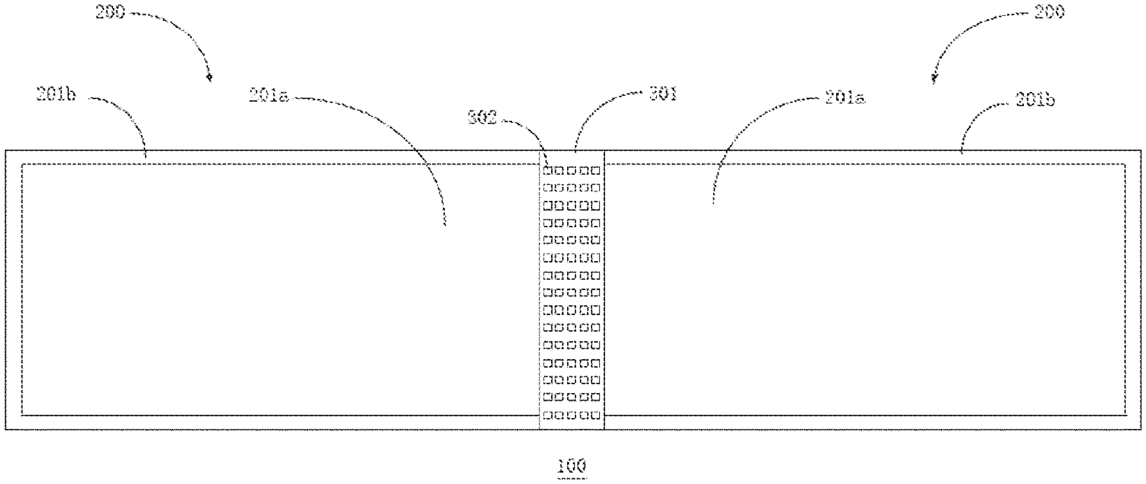
FIG. 3 is a schematic diagram of a spliced screen according to the present embodiment of the present disclosure.

With reference to FIG. 3, a spliced screen 100 includes a plurality of mutually spliced unit screens 200. The unit screens 200 includes an eminent surface 201. The eminent surface 201 is formed by a display area 201*a* and a frame area 201*b*. The frame area 201*b* surrounds the display area 201*a*.

Figure 4:
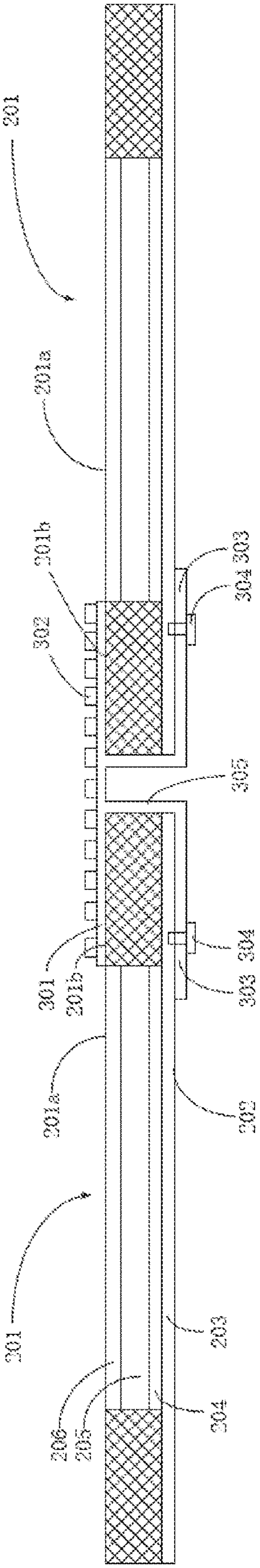
FIG. 4 is a sectional diagram of the spliced screen according to the present embodiment of the present disclosure.
Figure 5:
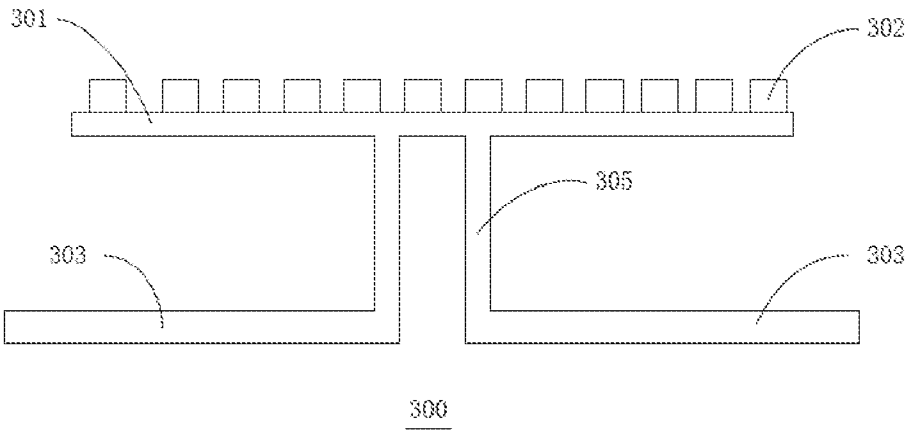
FIG. 5 is a schematic diagram of a light bar in the spliced screen according to the present embodiment of the present disclosure.

With reference to FIG. 3 and FIG. 4, the spliced screen 100 further includes a light bar 300. The light bar 300 is arranged between two of the spliced unit screens 200. The light bar 300 includes a cover area 301 and a plurality of light-emitting units 302. The cover area 301 abuts on an eminent surface 201 of the unit screens 200. The plurality of light-emitting units 302 is disposed on one side of the cover area 301 away from the eminent surface 201. A part or more of the light-emitting units 302 cover the area between the two display areas 201*a* of the two unit screens 200.

The spliced screen 100 is a display screen including a plurality of unit screens 200 that are spliced with one another. The unit screens 200 is a display screen with a separate display panel structure. The eminent surface 201 is one surface of the unit screens 200 for displaying images. The outlet surface 201 includes a display area 201*a* for displaying images and a frame area 201*b* that cannot be displayed. Further, the light-emitting unit 302 is a self-illuminated pixel unit like a light-emitting diode (LED) chip as shown in the present embodiment or a light-emitting unit 302 of other types, which is not defined in the present disclosure. If the light-emitting unit 302 as an LED chip is utilized, it can be a mini LED chip or an ordinary LED chip.

Figure 1:
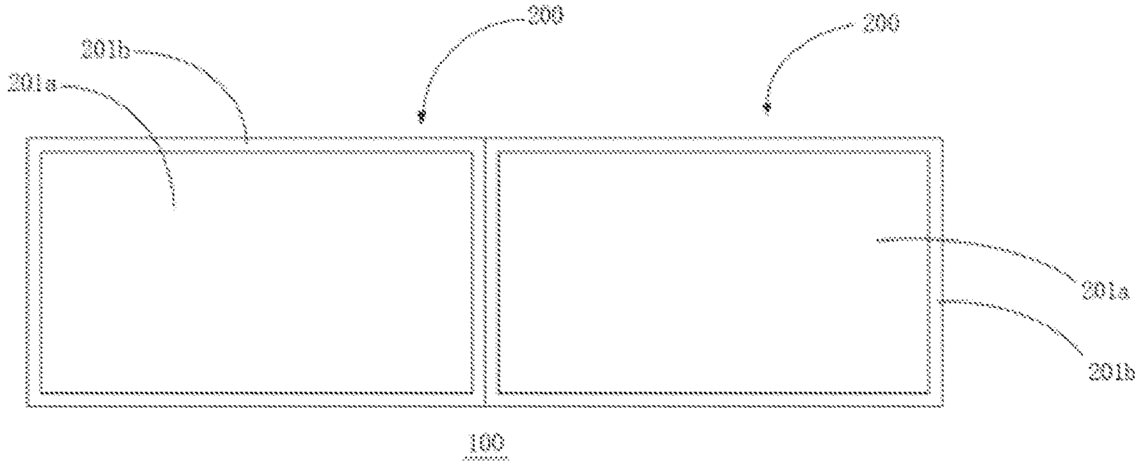
FIG. 1 is a schematic diagram of a spliced screen of the related art.
Figure 2:
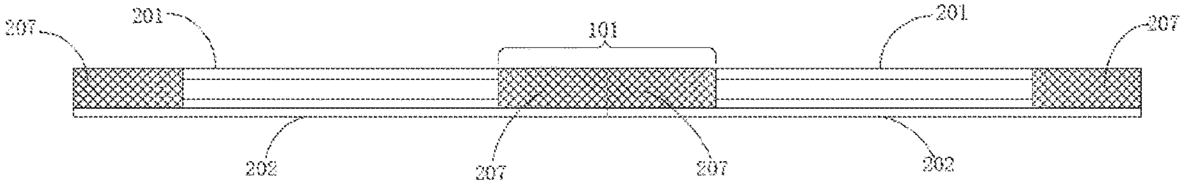
FIG. 2 is a sectional diagram of the spliced screen of the related art.

With reference to FIG. 1 and FIG. 2, a slit 101 is formed by the frame 207 of the unit screens 200 and the frame gap in each of the unit screens 200 for a spliced screen 10 of the related art. The slits 101 in the related art can affect the user’s visual sensory and decrease the screen-to-body ratio of the spliced screen 100 visually.

The light-emitting unit 302 is arranged and covers the area between the display areas 201*a* of the two unit screens 200. When the display area 201*a* of the unit screens 200 normally functions, the plurality of light-emitting units 302 on the light bar 300 can be transmitted and displayed synchronously, cover an area which cannot be shown between the display areas 201*a* of the two unit screens 200, and further, weaken or eliminate the slit 101 visually. In this way, the display screen of each of the unit screens 200 is coherently connected to the display screen, and the visual screen-to-body ratio increases as well.

The area between the two display areas 201*a* of the two unit screens 200 may merely includes frame areas 201*b* of two unit screens 200. While the arrangement is adopted, the frame 207 of the two unit screens 200 is tightly connected, no frame gaps are generated on the two unit screens 200.

With reference to FIG. 4, in addition to the area between the two display areas 201*a* of the two unit screens 200 including a frame area 201*b* of the two unit screens 200, the two unit screens 200 further includes a frame gap. While the arrangement is adopted, the frame 207 of the two unit screens 200 is arranged at intervals to form a slit as a frame gap between the display areas 201*a* of the two unit screens 200.

The plurality of unit screens 200 are mutually spliced in parallel to form a spliced screen 100. However, it is not understood as the defined method of splicing the unit screens 200 in the present disclosure. For instance, two spliced unit screens 200 form an angle in an embodiment. At this time, a light-emitting unit 302 covers the area between display areas 201*a* of the two unit screens 200.

As introduced in the embodiment of the present disclosure, the light-emitting unit 302 totally covers the area between the display area 201*a* of the two unit screens 200 to achieve the effect of visually eliminating the slit 101. The light-emitting unit 302 may partially cover the area between the display area 201*a* of the two unit screens 200 to achieve the effect of visually eliminating the slit 101. No specific limits are provided in the present disclosure.

Moreover, the spliced screen 100 includes the two unit screens 200 only, but it is not understood that the present disclosure puts a limit on the number of unit screens 200 including the spliced screen 100. The spliced screen 100 may include more than three unit screens 200, such as four, five, six unit screens 200, etc. When the number of unit screens 200 which the spliced screen 100 includes is more than three, the method of splicing each of the unit screens 200 is not limited to sequential splicing; instead, the method may be that one of the unit screens 200 is spliced to the other of unit screens 200.

The frame slit of the spliced screen 100 is reduced by shortening the gap between the unit screens 200. However, a frame area 201*b* are inevitably generated on the eminent surface 201 of the unit screens 200, the size of the slit 101 is mainly determined by the frame area 201*b*. A part or more of the light-emitting units 302 cover the frame area 201*b* at the spliced area of the two unit screens 200 to reduce the influence of the frame area 201*b* on display.

The light bar 300 may be connected to the unit screens 200 by means of bonding. However, the light bar 300 and the unit screens 200 are taken apart from each other more easily by boning connection, which reduces the reliability of the spliced screen 100 and affects the user's experience.

The unit screens 200 further includes a backlight surface 202 arranged back away the eminent surface 201. The light bar 300 further includes a defined area 303. The defined area 303 is arranged on one side of the backlight surface 202 of the two unit screens 200 that abut on each other. Additionally, the defined area 303 butts on the backlight surface 202 of the two unit screens 200, respectively, and the defined area 303 is connected to the cover area 301.

The defined area 303 and the cover area 301 form a mount that abuts on the eminent surface 201 and the backlight surface 202, respectively. The unit screens 200 is firmly disposed between the defined area 303 and the cover area 301. It is notified that the contact area of the backlight surface in the defined area 303 may be different from the contact area of the backlight surface in the two unit screens 200.

The defined area 303 and the cover area 301 may be connected with a connecting area 305. The connecting area 305 may be arranged in a non-spliced area of the unit screens 200. But for this kind of connection, the users find out the connecting unit 305 in no time, which affects the display effect of the spliced screen 100.

The light bar 300 further includes a connecting area 305. The connecting area 305 is disposed in the slit between the two unit screens. The defined area 303 is connected to the cover area 301 with the connecting area 305; that is, the connecting area 305 is arranged in the frame gap between the two-part units 200. For this kind of connection, the connecting area 305 is covered by the light-emitting unit 302, so the users do not discover the connecting unit 305 immediately and the users' user experience is improved. Moreover, after the connecting area 305 is provided, the entire light bar 300 is presented as an H shape or substantially as an H shape. In this way, the structure and performance of the light bar 300 is relatively reliable.

The shape and arrangement of the connecting area 305 may be correspondingly adjusted according to the practical situation. In a preferred embodiment of the present disclosure, an elastic tension component like a rubber layer is disposed on the connecting area 305. The elastic tension component is connected to the connecting area 305 so that the area where the connecting area 305 and the cover area 301 are connected and the area where the connecting area 305 and the defined area 303 are connected have a tendency to move toward each other. The elastic tension component can impart an elastic force to the cover area 301 and the defined area 303, respectively. The cover area 301 and the defined area 303 have the same moving tendency to move so the cover area 301 and the defined area 303 are more securely defined to the unit screens 200 to improve the limit effect.

For the driving method of the light-emitting unit 302, the light bar 300 includes a circuit board on which a driving wiring and a display driving unit configured to drive the light-emitting unit 302 are integrally disposed. The display driving unit is arranged on the defined area 303. The driving wiring is electrically connected to the display driving unit. The driving wiring is sequentially extended to the connecting area 305 and the cover area 301 from the defined area and electrically connected to the light-emitting unit 302. The driving wiring is configured to control the light-emitting unit 302 to display and provide the light-emitting unit 302 with a power supply. The display driving unit is arranged one side of the backlight surface 202 of the unit screens 200, so the appearance of the spliced screen 100 is not affected by the display driving unit and the risk of causing the display driving unit ineffective is reduced. Since some technical solutions to the display driving unit for driving the light-emitting unit 302 for image display are disclosed in the technical solutions of the related art so the precise details of the display driving unit and the specific method and principle of arranging the driving wiring are not disclosed, and the principle is accumulated. In addition, the light bar 300 may further be a flexible circuit board aimed at improving the structural properties of the light bar 300.

Besides, to improve the connection effect between the light bar 300 and the unit screens 200 better, the light bar 300 further includes a first connecting structure disposed on the defined area 303. A second connecting structure is formed on the backlight surface 202 of the unit screens 200 and is adapted to the first connecting structure. The first connecting structure is connected to the second connecting structure. The connection effect between the light bar 300 and the unit screens 200 is effectively enhanced, and the connection stability between the light bar 300 and the unit screens 200 is obviously increased as well through the first connecting structure and the second connecting structure.

Specifically, the first connecting structure is a tapped hole which is formed and sunken on the backlight surface 202 of the unit screens 200. The second connecting structure is a screw 304, and the tapped segment of the screw 304 penetrates the defined area 303 and is tapping-connected to the tapped hole. Because the tapped hole adapted to the screw 304 is connected to the screw 304, the structure is more compact. Such a structure is especially good for large-scale production.

In addition, in a preferred embodiment, a first connecting structure is a jack which is formed on a backlight surface 202 of a unit screen 200. The second connecting structure is a swapping block. One terminal of the swapping block is a plug-in terminal, and the shape of the plug-in terminal and the shape of the jack is complementary. The plug-in terminal passes through the defined area 303 and inserted into the jack. The other terminal of the swapping block extends out of one side of the defined area 303 back away from the unit screens 200 and is bent in shape. The unit screens 200 includes a backlight module 203, an array substrate 204, a liquid crystal layer 205, and an opposite substrate 206 in the embodiment of the present disclosure. The backlight module 203, the array substrate 204, the liquid crystal layer 205, and the opposite substrate 206 are stacked in a direction to eminence. A part or more of the jacks extends to the backlight module 203.

The backlight module 203 gives off some heat while operating. A part or more of the jack extends to the backlight module 203. When the plug-in terminal is inserted into the jack, the heat given off by the backlight module 203 spreads through the jack and the swapping block. The swapping block is bent in shape and extends at one terminal of the defined area 303 to increase the thermal communication area of the swapping block and the outside. Therefore, the backlight module 203 is dissipated with the help of the swapping block so that the heat of the backlight module 203 can be spread faster to the outside. At the same time, since the swapping block is arranged outside the backlight surface 202 of the unit screens 200, the heat generated by the swapping block does not affect the operation of the array substrate 204, which effectively improves the reliability of the operation of the display panel. Furthermore, the bending shape of the terminal of the swapping block may be, but is not limited to, wavy and curve.

Furthermore, the unit screens 200 includes a backlight module 203, an array substrate 204, a liquid crystal layer 205, and an opposite substrate 206. The backlight module 203, the array substrate 204, the liquid crystal layer 205, and the opposite substrate 206 are stacked in a direction to eminence. A part or more of the tapped holes extends to the backlight module 203.

A person skilled in the art can further choose a first connecting structure and a second connecting structure as introduced above according to practical situations. Moreover, the opposite substrate 206 is a color film substrate in the present embodiment while a person skilled in the art may choose an opposite substrate 206 according to practical situations correspondingly.

For the spliced screen 100, to match the light-emitting unit 302 and the display area 201*a* for displaying images, it is necessary to arrange the light-emitting unit 302 in an array on the cover area 301. It is understood that, a subpixel unit is arranged in an array in the display area 201*a* for the unit screens 200. A projection of the light-emitting unit 302 and a projection of the subpixel unit are arranged in an array at the junction of the light-emitting unit 302 and the display area 201*a* on the eminent surface 201. The arrangement in an array may be a displaced arrangement, a partially overlapping arrangement, an arrangement with different sizes, or a combination of the arrangements as mentioned above. The display effect of the junction of the light-emitting unit 302 and the display area 201*a* may be affected accordingly.

The unit screens 200 further includes a subpixel unit disposed in an area corresponding to the display area 201*a*. A projection of the subpixel unit onto the eminent surface 201 of the unit screens 200 and a projection the light-emitting unit 302 onto the eminent surface 201 of the unit screens 200 are arranged in an array. In other words, each pixel area in the projection array of the light-emitting unit 302 is consistent to each pixel area in the eminent surface 201 of the unit screens 200 in arrangement. Such an arrangement increases the display effect at the junction of the light-emitting unit 302 and the display area 201*a*.

Embodiment 2

A display device proposed by a second embodiment of the present disclosure may be any type of display device including a spliced screen 100, such as a flat panel, a mobile phone, a computer display, a virtual reality (VR) device, etc.

The terminology used herein is for the purpose of describing particular embodiments and is not intended to be limiting of the inventive concept. As used herein, the singular forms “a” and “an” are intended to include the plural forms as well, unless the context clearly indicates otherwise. It will be further understood that the terms “includes,” “including,” “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Expressions such as “at least one of,” when preceding a list of elements, modify the entire list of elements and do not modify the individual elements of the list. Further, the use of “may” when describing embodiments of the inventive concept refers to “one or more embodiments of the inventive concept.”

It will be understood that when an element or layer is referred to as being “on”, “connected to”, “coupled to”, or “adjacent to” another element or layer, it can be directly on, connected to, coupled to, or adjacent to the other element or layer, or one or more intervening elements or layers may be present. When an element or layer is referred to as being “directly on,” “directly connected to”, “directly coupled to”, or “immediately adjacent to” another element or layer, there are no intervening elements or layers present.

As used herein, the term “substantially,” “about,” and similar terms are used as terms of approximation and not as terms of degree, and are intended to account for the inherent variations in measured or calculated values that would be recognized by those of ordinary skill in the art.

In the description of this specification, the description of the terms “one embodiment”, “some embodiments”, “examples”, “specific examples”, or “some examples”, and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

What is claimed is:

1. A spliced screen, comprising:

a plurality of unit screens, spliced to one another; each of the plurality of unit screens comprising an eminent surface and a backlight surface; the eminent surface and the backlight surface being arranged opposite; the eminent surface being formed by a display area and a frame area; the frame area surrounding the display area;

a light bar, disposed between two of the unit screens, comprising:

a cover area, abutting on the eminent surfaces of the two unit screens;

a plurality of light-emitting units, disposed on a side of the cover area away from the eminent surfaces; a part or more of the light-emitting units covering an area between the two display areas of the two unit screens; and a defined area, firmly connected to the cover area and butting on the backlight surfaces of the two unit screens.

2. The spliced screen according to claim 1, wherein a part or more of the light-emitting units cover the frame area at a spliced area of the two unit screens.

3. The spliced screen according to claim 1, wherein areas of the backlight surfaces of the unit screens contacting the defined area are the same.

4. The spliced screen according to claim 2, wherein the light bar further comprises a connecting area; the connecting area is disposed in a slit between the two unit screens; the defined area is connected to the cover area with the connecting area.

5. The spliced screen according to claim 4, wherein the light bar comprises a driving wiring and a display driving unit configured to drive the light-emitting unit; the display driving unit is arranged on the defined area; the driving wiring is electrically connected to the display driving unit; the driving wiring is sequentially extended to the connecting area and the cover area from the defined area and electrically connected to the light-emitting unit.

6. The spliced screen according to claim 4, wherein the light bar comprises an elastic tension component; the elastic tension component is disposed on the connecting area; the elastic tension component is connected to the connecting area so that the area where the connecting area and the cover area are connected and the area where the connecting area and the defined area are connected have a tendency to move toward each other.

7. The spliced screen according to claim 6, wherein the elastic tension component is made of rubber.

8. The spliced screen according to claim 1, wherein the light bar further comprises a first connecting structure disposed on the defined area; a second connecting structure is formed on the backlight surface of the unit screen and is adapted to the first connecting structure; the first connecting structure is connected to the second connecting structure.

9. The spliced screen according to claim 8, wherein the first connecting structure is a tapped hole which is formed and sunken on the backlight surface of the unit screens; the second connecting structure is a screw, and the tapped segment of the screw penetrates the defined area and is tapping-connected to the tapped hole.

10. The spliced screen according to claim 8, wherein the first connecting structure is a jack which is formed and sunken on the backlight surface of the unit screens; the second connecting structure is a swapping block; a terminal of the swapping block is a plug-in terminal; the shape of the plug-in terminal and the shape of the jack is complementary; the plug-in terminal passes through the defined area and inserted into the jack; the other terminal of the swapping block extending out of one side of the defined area back away from the unit screens is a bending terminal.

11. The spliced screen according to claim 10, wherein the unit screen comprises a backlight module, an array substrate, a liquid crystal layer, and an opposite substrate; the backlight module, the array substrate, the liquid crystal layer, and the opposite substrate are stacked in a direction to eminence; a part or more of the tapped holes extends to the backlight module.

12. The spliced screen according to claim 1, wherein the unit screen further comprises a sub pixel unit disposed in an area corresponding to the display area; a projection of the subpixel unit onto the eminent surface of the unit screens and a projection the light-emitting unit onto the eminent surface of the unit screens are arranged in an array.

13. A display device comprising the spliced screen as claimed in claim 1.

* * * * *